(12) United States Patent
Chen et al.

(10) Patent No.: US 8,578,217 B2
(45) Date of Patent: Nov. 5, 2013

(54) SYSTEM AND METHOD FOR VIRTUAL MACHINE MANAGEMENT

(75) Inventors: Wei Chen, Hangzhou (CN); Long Wen Lan, Shanghai (CN); Xian Dong Meng, Shanghai (CN); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/825,911

(22) Filed: Jun. 29, 2010

(65) Prior Publication Data

US 2010/0332890 A1 Dec. 30, 2010

(30) Foreign Application Priority Data

Jun. 30, 2009 (CN) .......................... 2009 1 0148714

(51) Int. Cl.
 *G06F 11/00* (2006.01)
(52) U.S. Cl.
 USPC .................................... 714/48; 714/2; 714/57
(58) Field of Classification Search
 USPC ................................................. 714/48, 2, 57
 See application file for complete search history.

(56) References Cited

U.S. PATENT DOCUMENTS

| 5,129,043 | A | * | 7/1992 | Yue .................................. 706/60 |
| 5,204,939 | A | * | 4/1993 | Yamazaki et al. ............... 706/50 |
| 5,204,940 | A | * | 4/1993 | Kitagawa et al. ................ 706/48 |
| 6,108,670 | A | * | 8/2000 | Weida et al. .......................... 1/1 |
| 6,560,592 | B1 | * | 5/2003 | Reid et al. ............................. 1/1 |
| 6,856,980 | B2 | * | 2/2005 | Feldman et al. ................. 706/47 |
| 6,892,383 | B1 | | 5/2005 | Arndt |
| 7,035,849 | B2 | * | 4/2006 | Tifft ....................................... 1/1 |
| 7,065,745 | B2 | * | 6/2006 | Chan .............................. 717/117 |
| 7,302,593 | B2 | * | 11/2007 | Rothman et al. ............... 713/300 |
| 7,313,552 | B2 | * | 12/2007 | Lorenz et al. .................... 706/47 |
| 7,483,974 | B2 | | 1/2009 | Goud et al. |
| 7,499,900 | B2 | * | 3/2009 | Biger et al. ...................... 706/47 |
| 7,590,873 | B2 | * | 9/2009 | Takahashi et al. ............. 713/300 |
| 7,734,754 | B2 | * | 6/2010 | Dougherty et al. ........... 709/223 |
| 7,747,736 | B2 | * | 6/2010 | Childress et al. ............. 709/224 |

(Continued)

FOREIGN PATENT DOCUMENTS

| CN | 101030863 A | 9/2007 |
| CN | 101076782 A | 11/2007 |
| CN | 101441506 A | 5/2009 |

OTHER PUBLICATIONS

IBM Corporate Communications, IBM presenteert gebruiksklare virtualisatie Blade Server, Mar. 5, 2008, http://www.ibm.com/news/nl/nl/2008/03/04/x036305q26105d66.html.

*Primary Examiner* — Loan L. T. Truong
(74) *Attorney, Agent, or Firm* — The Steadman Law Firm PLLC; Cynthia G. Seal; Katherine S. Brown (57) ABSTRACT

A system and method are provided for virtual machine management. The system comprises a virtual machine manager, a blade server management module, at least one blade server, and a virtual machine manager. The virtual machine manager comprises an abnormal event receiving module for receiving information about a blade server having a hardware problem directly from the blade server management module and additionally a virtual machine management module for sending a processing command to a virtual machine hypervisor on the blade server having the hardware problem. The virtual machine management module receives the information about the hardware problem from the abnormal event receiving module. The processing command is determined in accordance with the information about the hardware problem and strategies for handling predefined hardware problems.

22 Claims, 5 Drawing Sheets

(56) References Cited

U.S. PATENT DOCUMENTS

| | | | |
|---|---|---|---|
| 7,849,045 B2* | 12/2010 | Herrera et al. | 706/59 |
| 2002/0049691 A1* | 4/2002 | Majoor | 706/47 |
| 2002/0099834 A1* | 7/2002 | Sielaff et al. | 709/228 |
| 2004/0024831 A1* | 2/2004 | Yang et al. | 709/208 |
| 2004/0109406 A1* | 6/2004 | Rothman et al. | 370/216 |
| 2004/0153697 A1* | 8/2004 | Chang et al. | 714/4 |
| 2004/0202182 A1* | 10/2004 | Lund et al. | 370/395.21 |
| 2005/0193259 A1* | 9/2005 | Martinez et al. | 714/34 |
| 2006/0184349 A1* | 8/2006 | Goud et al. | 703/24 |
| 2007/0078988 A1* | 4/2007 | Miloushev et al. | 709/227 |
| 2007/0083723 A1* | 4/2007 | Dey et al. | 711/163 |
| 2007/0088980 A1* | 4/2007 | Greenspan et al. | 714/13 |
| 2007/0186212 A1* | 8/2007 | Mazzaferri et al. | 718/1 |
| 2007/0300069 A1* | 12/2007 | Rozas | 713/176 |
| 2008/0028397 A1 | 1/2008 | Gupta | |
| 2008/0201711 A1 | 8/2008 | Amir Husain | |
| 2008/0313613 A1* | 12/2008 | Bierhoff et al. | 717/116 |
| 2009/0158081 A1 | 6/2009 | Dake et al. | |

* cited by examiner

FIG. 1

(State of the Art)

SYSTEM AND METHOD FOR VIRTUAL MACHINE MANAGEMENT

RELATED APPLICATION

This application claims priority under 35 U.S.C. §119 to Chinese Patent Application No. 200910148714.6 filed Jun. 30, 2009, the entire text of which is specifically incorporated by reference herein.

FIELD OF THE INVENTION

The various embodiments described herein generally relate to the computer field. More particularly, the various embodiments relate to a system and method for virtual machine management.

BACKGROUND

Currently, a significant number of data centers require servers to have improved performance and utility without increasing the physical space, cost, and management difficulty of the data center. The blade server is being developed in view of such requirements. The blade server system integrates a plurality of blade servers into one system with one standard base, and the operating systems and applications of each blade server are all independent.

Figure 1:
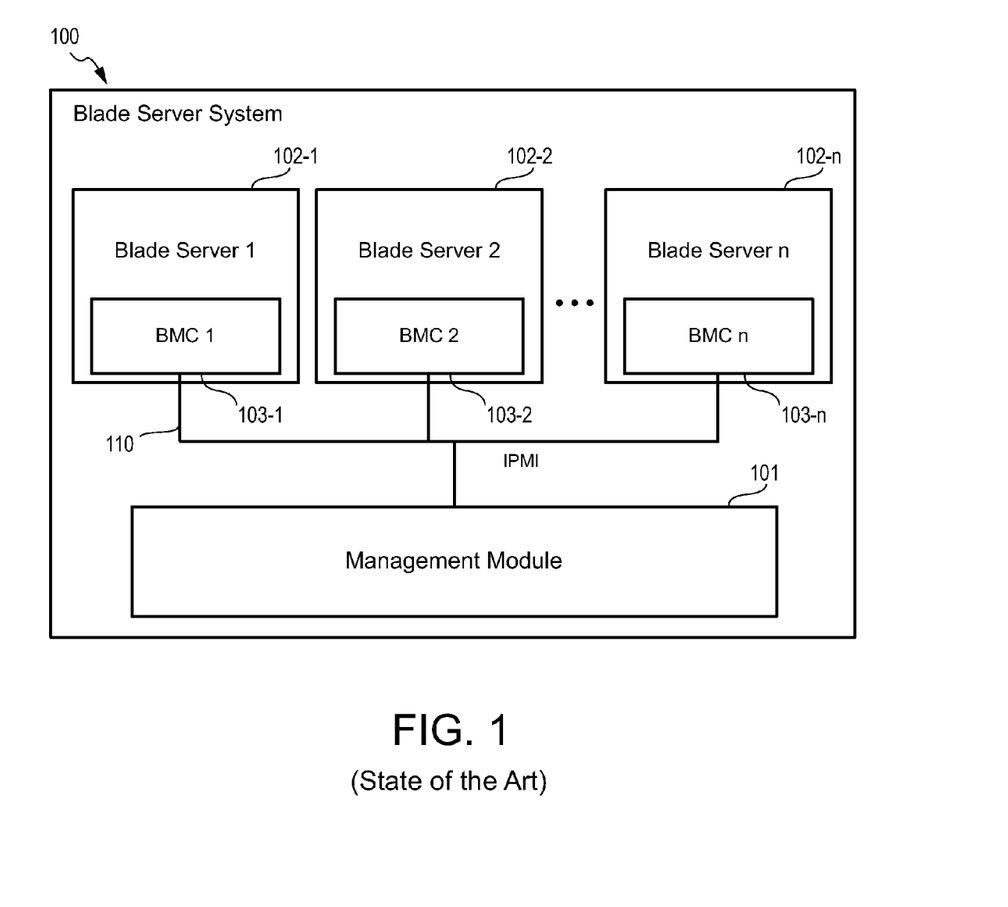
FIG. 1 schematically illustrates the management architecture of a blade server system according to the state of the art.

FIG. 1 schematically illustrates the management architecture of a blade server system in accordance with the state of the art. In the blade server system 100 in FIG. 1, a base includes a management module 101, which provides a unified management interface for all of the modules on the base, such as blade servers 102-1, 102-2, . . . 102-n as shown in FIG. 1. Moreover, the management module 101 may manage an I/O switching module, a power supply module, a fan, a network connection module, and other modules not shown in FIG. 1. The management for the blade server system 100 is in accordance with the IPMI (Intelligent Platform Management Interface) standard. The core of the IPMI architecture is a microprocessor known as a baseboard management controller (BMC) 103. The BMC 103 of each blade server 102 provides for hardware of each blade server with the functions of autonomic monitoring, event log, recovery controlling, configuration, etc. Additionally, the BMC 103 of each blade server 102 can collect trend data, predict platform errors, and provide a unified interface for the management module 101. The management module 101 communicates with the BMC 103 of each blade server 102 by IPMI messages sent via a system management bus 110. Moreover, the management module 101 supports functions such as powering on, powering off, reporting of errors and events, and coordinating usage of shared resources among the blade servers 102.

Another important technique with respect to the data center is the virtualization technique. Virtualization has become a significantly important technique used in a blade server system, as virtualization enables improved consolidation of servers, increases performance, simplifies management, and improves efficiency. In accordance with the virtualization technique, two types of machines are included, one being a virtual machine manager, and the other being a server functioning as a virtual machine host. Different operating systems can run on different virtual machines. Commonly used virtualization software offerings currently include VMware, Xen, Microsoft Hyper-V, etc. The functions of such software offerings are similar.

The virtual machine manager, as a manager for the virtualization system, does not focus upon the physical structure and the functional features of the server as does the virtual machine host. Thus, in the virtual machine systems in the known art, virtual machine managers detect whether a server functioning as a virtual machine host operates normally by detecting a "heartbeat". Heart beat detection is a software solution based on the network "ping" operation. The virtual machine manager maintains the heart beats with each server functioning as a virtual machine host, while each virtual machine host further maintains the heart beats with other virtual machine hosts in the cluster. The timeout period of the heart beat is usually set to several tens of seconds, taking into account network congestion and delay. Meanwhile, the known method based on heart beat detection has inherent disadvantages of being inaccurate and unreliable.

In addition, in virtual machine systems in the known art, the number of servers functioning as virtual machine hosts that can be managed by a single virtual machine manager is limited. Considering WMware as an example, the current version can only support approximately 200 servers as virtual machine hosts, and at most 2000 virtual machines. Considering one data center having 2000 or more servers, the virtual machine manager must establish connections with the 2000 or more servers functioning as virtual machine hosts, manage thousands or tens of thousands of virtual machines, maintain their realtime states, send managing commands via the server connections, etc. Thus, in accordance with the known art, at least 10 virtual machine managers are necessary. In addition, the current virtual machine managing system cannot customize particular backup and error recovery solutions for different events with respect to each virtual machine.

SUMMARY

In order to address the aforementioned issues in the known art, the various embodiments described herein provide a system method, and virtual machine management apparatus.

More specifically, in accordance with a first aspect of the various embodiments described herein, a system is provided. The system comprises a virtual machine manager, a blade server management module, at least one blade server, and a virtual machine manager. The virtual machine manager may be integrated into the blade server management module. The virtual machine manager comprises an abnormal event receiving module for receiving information about a blade server having a hardware problem directly from the blade server management module and additionally a virtual machine management module for sending a processing command to a virtual machine hypervisor on the blade server having the hardware problem. The virtual machine management module receives the information about the hardware problem from the abnormal event receiving module. The processing command is determined in accordance with the information about the hardware problem and strategies for handling predefined hardware problems. Furthermore, the virtual machine manager manages resources of the at least one blade server as a virtual machine host, and additionally the virtual machine manager manages at least one virtual machine operating on the at least one blade server.

In accordance with an embodiment, the virtual machine management module of the system comprises a storage module for storing a mapping relationship between the predefined hardware problems and the strategies for handling the predefined hardware problems. Moreover, in accordance with an embodiment, the virtual machine management module comprises an external service interface module for receiving a managing command and for returning an execution result with respect to the managing command, a command processing module for processing the managing command, a resource pool for storing properties with respect to resources of the system, and a resource pool management module for updating one or more of the properties stored in the resource pool in response to one or more corresponding changes to the resources of the system. Such properties include a number of resources and a number of available resources of the system, a number of resources and a number of available resources of the at least one blade server, and a number of resources, a configuration, and a state of the at least one virtual machine.

In accordance with an embodiment, in response to the managing command received by the external service interface module being from an external virtual machine manager, the external virtual machine manager manages the virtual machine manager as a virtual machine host. In such case, the external virtual machine manager has a capability to inquire about the number of resources and the number of available resources of the system and also has a capability to inquire about the number of resources, the configuration, and the state of the at least one virtual machine. However, the external virtual machine manager in such case does not have a capability to inquire about the number of resources and the number of available resources of the at least one blade server. In response to an association between the managing command and the resources of the system as indicated in the resource pool, the command processing module processes the managing command in accordance with the managing command and the resources of the at least one blade server.

In accordance with another embodiment, in response to the managing command received by the external service interface module being from a client of the virtual machine manager, the virtual machine manager manages the at least one blade server as a virtual machine host. In such case, the client has a capability to inquire about the number of resources and the number of available resources of the at least one blade server as well as the number of resources and the number of available resources of the system, and the number of resources, the configuration, and the state of the at least one virtual machine. In response to an association between the managing command and the resources of the system as indicated in the resource pool, the command processing module processes the managing command in accordance with the managing command and the resources of the at least one blade server.

Furthermore, in accordance with an embodiment, the virtual machine management module of the system may comprise a strategy checker for determining the presence of any issue with respect to the strategies for handling the predefined hardware problems.

In accordance with a second aspect of the various embodiments described herein, a method for processing with respect to a system is provided. The system includes a virtual machine manager, a blade server management module, and at least one blade server. The method comprises receiving information about a blade server having a hardware problem directly from the blade server management module and sending a processing command to a virtual machine hypervisor on the blade server having the hardware problem. The processing command is determined in accordance with the information about the hardware problem and strategies for handling predefined hardware problems. Moreover, the method comprises managing resources of the at least one blade server as a virtual machine host and operating at least one virtual machine on the at least one blade server. Furthermore, the method comprises storing a mapping relationship between the predefined hardware problems and the strategies for handling the predefined hardware problems.

In accordance with an embodiment, the method further comprises receiving a managing command, processing the managing command, and returning an execution result of the managing command. Additionally, the method further comprises storing properties with respect to resources of the system and updating one or more of the properties in response to one or more corresponding changes to the resources of the system. The properties include a number of resources and a number of available resources of the system, a number of resources and a number of available resources of the at least one blade server, and a number of resources, a configuration, and a state of the at least one virtual machine.

In accordance with an embodiment, in response to the managing command being from an external virtual machine manager, the method further comprises managing the virtual machine manager as a virtual machine host via the external virtual machine manager. In such case, the external virtual machine manager has a capability to inquire about the number of resources and the number of available resources of the system, and the number of resources, the configuration, and the state of the at least one virtual machine. However, the external virtual machine manager in such case does not have a capability to inquire about the number of resources and the number of available resources of the at least one blade server.

In accordance with another embodiment, in response to the managing command being from a client of the virtual machine manager, the method further comprises managing the at least one blade server as a virtual machine host via the virtual machine manager. In such case, the client has a capability to inquire about the number of resources and the number of available resources of the at least one blade server as well as the number of resources and the number of available resources of the system, and the number of resources, the configuration, and the state of the at least one virtual machine.

In accordance with a third aspect of the various embodiments described herein, a virtual machine management apparatus is provided. The virtual machine management apparatus performs processing with respect to a blade server system. The virtual machine management apparatus comprises an abnormal event receiving module for receiving information with respect to a blade server having a hardware problem directly from a blade server management module. In addition, the virtual machine management apparatus comprises a virtual machine management module for sending a processing command to a virtual machine hypervisor on the blade server having the hardware problem.

In accordance with the various embodiments described herein, a hardware problem with respect to a blade server in a blade server system (e.g., a hardware malfunction or abnormality) can be quickly and accurately addressed. Moreover, the various embodiments provide a way to expand upon a known virtual machine manager in order to provide a capability to manage more virtual machines.

BRIEF DESCRIPTION OF THE DRAWINGS

The above and other objects, features, and advantages of the various embodiments are to be described in further detail herein with reference to the attached drawings, in which.

DETAILED DESCRIPTION

Exemplary embodiments now will be described in further detail with reference to the aforementioned drawings. The various embodiments can be implemented in various forms and accordingly are not limited by the embodiments disclosed herein.

Figure 2:
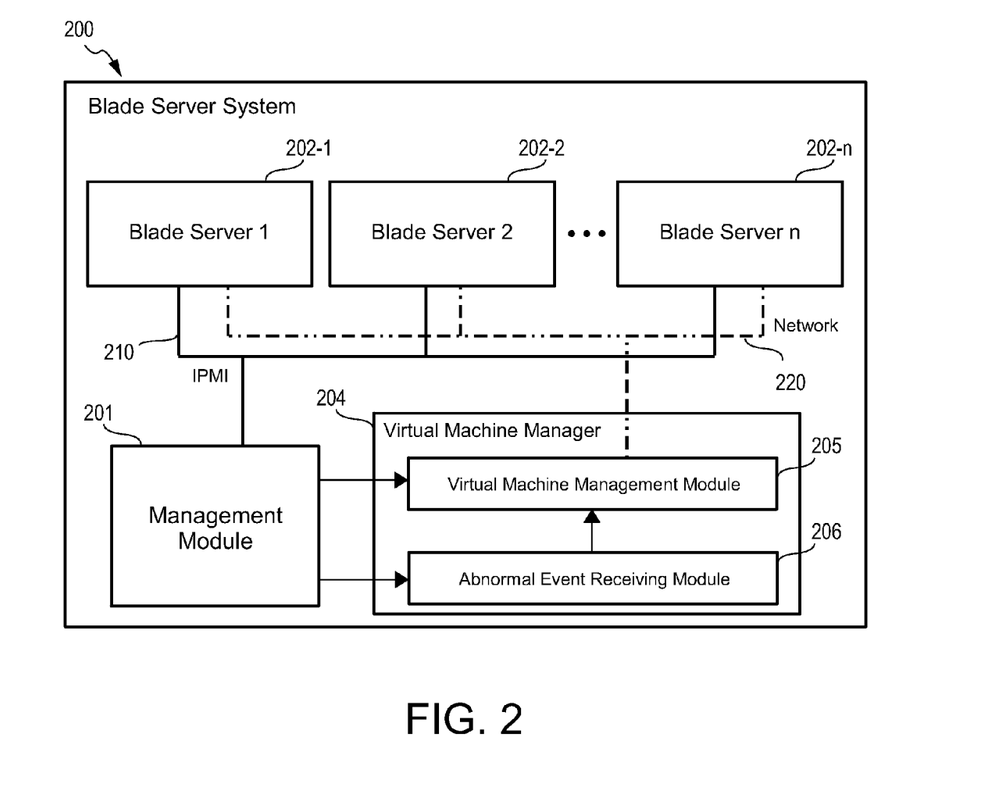
FIG. 2 schematically illustrates a blade server system according to an exemplary embodiment.

FIG. 2 schematically illustrates a blade server system 200 according to an exemplary embodiment. The blade server system 200 comprises a blade server management module 201, at least one blade server 202 (e.g., 202-1, 202-2, . . . 202-n as illustrated in FIG. 2), and a virtual machine manager 204. The management module 201 and the at least one blade server 202 (e.g., 202-1, 202-2, . . . 202-n) in the blade server system 200 are connected via a system management bus 210 (e.g., a bus in accordance with the IPMI standard). The virtual machine manager 204 and the at least one blade server 202 are connected via a network 220 (e.g., intranet, Internet, etc.). The virtual machine manager 204 comprises an abnormal event receiving module 206 for receiving information from the management module 201 regarding any hardware problem with respect to the at least one blade server 202. Moreover, the virtual machine manager 204 comprises a virtual machine management module 205 for sending a processing command to a virtual machine hypervisor (not shown) on the at least one blade server 202. More specifically, information about a blade server among the at least one blade server 202 having a hardware problem is received by the abnormal event receiving module 206, and the abnormal event receiving module 206 sends such information to the virtual machine management module 205. Consequently, the virtual machine management module 205 sends an appropriate processing command to the virtual machine hypervisor on the blade server having the hardware problem. The processing command is determined in accordance with the received information about the hardware problem and strategies for handling predefined hardware problems.

In accordance with an exemplary embodiment, the abnormal event receiving module 206 may be integrated into (i.e., may reside in) the virtual machine management module 205.

In accordance with another exemplary embodiment, the virtual machine management module 205 of the virtual machine manager 204 further manages resources of the at least one blade server 202 as a virtual machine host and also manages at least one virtual machine operating on the at least one blade server 202. In the virtual machine managing mode, a virtual machine hypervisor is installed on the at least one blade server 202 functioning as the virtual machine host. Each virtual machine hypervisor communicates with the virtual machine manager 204 and receives from the virtual machine manager 204 a command associated with virtual machine management on the relevant blade server. Thus, the managing command of the virtual machine manager 204 is directly sent to the virtual machine hypervisor on the relevant blade server.

The virtual machine management module 205 in FIG. 2 can perform the functions of the virtual machine manager as provided in the known art. The at least one blade server 202 in the blade server system functions as a virtual machine host, and the virtual machine manager 204 can create, destroy, start, stop, and/or continue operations of the virtual machines on these blade servers. However, as the virtual machine manager 204 manages the at least one blade server 202 as virtual machine hosts, one or more of the at least one blade server 202 may have a hardware problem. The virtual machine manager in the known art determines whether a blade server functioning as the virtual machine host has a problem by detecting a "heart beat". In accordance with such solution, taking the congestion and the delay of the network into account, the timeout period of the heart beat is usually set to at least several tens of seconds. Within such time period, since the hardware of the affected blade server may have totally failed, even the malfunction handling method for, e.g., migrating the virtual machines thereon onto other servers may be impossible due to total failure of any affected blade server. Moreover, the known method based on heart beat detection has an inherent disadvantage of being inaccurate and unreliable, and additionally the known method cannot particularly determine the nature of any malfunction or abnormality and cannot determine the system feature of the host. Thus, the known method based on heart beat detection cannot perform appropriate optimization processing with respect to the problem. Thus, processing with respect to a malfunction that is detected via "heart beat" is usually simplistic, involving either turning off any affected blade server or migrating the one or more virtual machines on any affected blade server to one or more other blade servers, so that the one or more virtual machine hypervisors on the one or more blade servers to which the virtual machine is migrated manage the one or more migrated virtual machines.

It is considered that when one server fails, there is usually a period of down time. Most server-based services require the down time to be shorter than a certain period. In accordance with a detection method based on the hardware and system management bus of a blade server system, a management module can detect or even predict the hardware failure within one second or less. Such detection method based on the hardware and system management bus is attractive for server-based services. However, in the virtual machine system 100 in accordance with the known art, such feature is not utilized. On the other hand, in accordance with an exemplary embodiment, the detection method based on the hardware and system management bus 210 of the blade server system 200 may be utilized, and additionally the known method based on "heart beat" detection also may be preserved as permitted by the system resources.

According to an exemplary embodiment, the virtual machine manager 204, the management module 201, and the at least one blade server 202 may be plugged into the base of the blade server system 200 and may be connected via an internal network and an external network (e.g., Internet). When connected via Internet, if the network is clear, the virtual machine manager 204 quickly can obtain from the network any information regarding any hardware problem with respect to the at least one blade server 202, and accordingly any hardware problem may be handled appropriately in a timely manner. However, if the network is congested or unsteady, there is a possibility that any information regarding any hardware problem with respect to the at least one blade server 202 cannot be obtained in a timely manner. Thus, in accordance with an exemplary embodiment, the virtual machine manager 204 may be integrated into (i.e., may reside in) the blade server management module 201. In such case, software modules in the virtual machine manager 204 and the blade server management module 201 can communicate with each other via inter-process communication such as pipelining, message queuing, shared memory, etc. Consequently, any problem caused by network congestion or unsteadiness, which potentially could result in an inability to handle any hardware malfunction or abnormality with respect to the at least one blade server 202, may be avoided. Moreover, in such case, prompt response to hardware problems occurring in the at least one blade server 202-1, 202-2, . . . 202-n may be facilitated.

Figure 3:
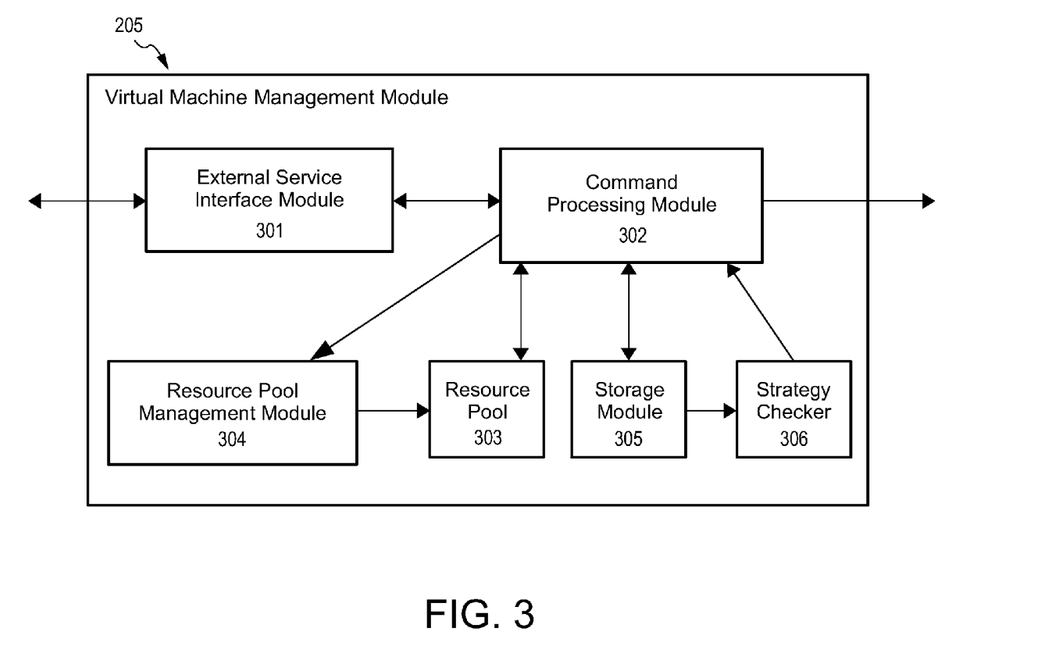
FIG. 3 schematically illustrates a virtual machine management module according to an exemplary embodiment.

FIG. 3 schematically illustrates a constitution of the virtual machine management module 205 in accordance with an exemplary embodiment. The virtual machine management module 205 comprises an external service interface module 301 for receiving a managing command external to the blade server system 200 and for returning an execution result with respect to the managing command. The virtual machine management module 205 further comprises a command processing module 302 for processing the managing command received by the external service interface module 301. Moreover, the virtual machine management module 205 comprises a resource pool 303 for storing properties with respect to the resources of the blade server system 200. Such properties include a number of resources (i.e., a number of all resources) and a number of available resources of the blade server system 200, a number of resources (i.e., a number of all resources) and a number of available resources of the at least one blade server 202 (which may function as a virtual machine host), and a number of resources, a configuration, a state of the at least one virtual machine. Additionally, the virtual machine management module 205 comprises a resource pool management module 304 for updating one or more of the properties stored in the resource pool 303 in response to one or more corresponding changes with respect to the resources of the blade server system 200. More specifically, the resource pool management module 304 updates the number of resources, the configuration, and/or the state of the at least one virtual machine in the resource pool 303 in response to any corresponding change in the blade server system 200. Moreover, the virtual machine management module 205 comprises a storage module 305 for storing a mapping relationship between predefined hardware problems and strategies for handling the predefined hardware problems. Here, the hardware problems can be defined according to malfunctions detected by the blade server management module 201. Such malfunctions may include power supply malfunction, fan malfunction, CPU overheating, etc. The strategies for handling the hardware problems may include migrating virtual machines, decreasing CPU frequency, powering off the affected blade server, etc. Exemplary mapping relationships include decreasing CPU frequency if a CPU is overheating, migrating a virtual machine onto a host with an IP address of 255.255.255.255 if a power supply malfunctions, and migrating a virtual machine onto the host with an IP address of 255.255.255.255 if a fan malfunctions.

Furthermore, in accordance with an exemplary embodiment, the virtual machine management module 205 may comprise a strategy checker 306. The strategy checker 306 is further described herein.

In addition to the aforementioned properties, information stored in the resource pool 303 includes a number of CPUs, memory capacity, magnetic disc capacity, etc. Such information is updated immediately by the resource pool management module 304. For example, if the number of blade servers in the blade server system 200 is increased or decreased, then the resource pool management module 304 immediately acquires a notification from the blade server management module 201 and appropriately updates the number of resources in the resource pool 303. Similarly, if a blade server in the blade server system 200 has a hardware problem, and/or if the number of resources is changed, then the resource pool management module 304 immediately acquires a notification from the management module 201 and appropriately updates the number of resources in the resource pool 303. In addition, if the activity of the command processing module 302 results in an increase, decrease, or other change with respect to the number of resources, the configuration, and/or the state of the at least one virtual machine, then the resource pool manager 304 appropriately updates the corresponding properties in the resource pool 303. The command processing module 302 processes a received managing command according to the number of resources as indicated in the resource pool 303.

In accordance with an exemplary embodiment, if a managing command received by the external service interface module 301 is from an external virtual machine manager (i.e., a virtual machine manager external to the blade server system 200), then the virtual machine manager 204 accepts the management of the external virtual machine manager. In the view of the external virtual machine manager, the entire blade server system 200 becomes a virtual machine host, and the virtual machine manager 204 of the blade server system 200 becomes a managing interface for the external virtual machine manager to manage the entire blade server system 200. That is to say, the virtual machine manager 204 is managed as a virtual machine host via the external virtual machine manager. During such management, the external virtual machine manager has a capability to inquire about the number of all resources and the number of available resources of the blade server system 200, and the number of resources, the configuration, and the state of the at least one virtual machine managed by the virtual machine manager 204, as indicated in the resource pool 303 of the virtual machine management module 205. However, the external virtual machine manager during such management does not have a capability to inquire about the internal resources of the at least one blade server 202 functioning as a virtual machine host.

In accordance with another exemplary embodiment, if the managing command received by the external service interface module 301 is from a client of the virtual machine manager (e.g., virtual machine manager client software), then the virtual machine manager 204 manages the at least one blade server 200 as a virtual machine host. During such management, the client of the virtual machine manager has a capability to inquire about the number of resources and the number of available resources of the at least one blade server 202 functioning as a virtual machine host as well as the number of all resources and the number of available resources of the blade server system 200, and the number of resources, the configuration, and the state of the at least one virtual machine, as indicated in the resource pool 303.

Regardless of whether the managing command received by the external service interface module 301 is from an external virtual machine manager or from a client of the virtual machine manager, in response to an association between a received managing command and the resources as indicated in the resource pool 303, the command processing module 302 processes the received managing command according to the received managing command and the available resources of the at least one blade server 202 functioning as a virtual machine host, as indicated in the resource pool 303. For example, suppose that the managing command received by the external service interface module 301 is from an external virtual machine manager and that the command requires that a virtual machine with one CPU, a memory of 1 G, and a hard disk of 20 G be built. In response to such managing command, the command processing module 302 inquires about the at least one blade server 202 functioning as a virtual machine host. If there is a particular blade server among the at least one blade server 202 that meets the demand as presented by the managing command, then a processing command is issued directing the particular blade server to build the requested virtual machine. Similarly, if the above managing command is from a client of the virtual machine manager 204, the same process is performed. The difference is that in the view of the external virtual machine manager, the entire blade server system 200 is a single virtual machine host; while the external virtual machine manager can determine how many virtual machines there are in the blade server system 200, the external virtual machine manager cannot discern (and need not be concerned with) the internal blade servers functioning as virtual machine hosts. Thus, under the condition of equivalent managing capability, the number of real blade servers that can be managed by the external virtual machine manager can be significantly increased.

As previously mentioned, in accordance with an exemplary embodiment, mapping relationships between predefined hardware problems and strategies for handling the predefined hardware problems can be stored in the storage module 305. When a blade server (functioning as a virtual machine host) among the at least one blade server 202 has a hardware problem, a handling strategy with respect to the hardware problem is determined in accordance with the hardware problem and a stored mapping relationship, and consequently a processing command required by the handling strategy is sent to the virtual machine hypervisor of the blade server having the hardware problem. Accordingly, appropriate processing is performed.

The handling strategies with respect to the predefined hardware problems can be defined by a user via a client of the virtual machine manager or alternatively can be defined by directly importing the handling strategies of other virtual machine managers. The handling strategies can consider the configuration or activity inside the blade server system 200. For example, if one of four power supplies of the blade server system 200 fails, a virtual machine on a blade server among the at least one blade server 202 to which the failed power supply is supplied can be migrated to blade servers with the power supplies that have not failed. As previously mentioned, in accordance with an exemplary embodiment, the virtual machine management module 205 further comprises a strategy checker 306 for determining whether the various handling strategies have potential issues. For example, assume that a handling strategy provides for migration of a virtual machine on a blade server A to a blade server B in the event that the blade server A has a hardware problem. This exemplary handling strategy seems to have no issues, but if the CPU of the blade server A is Power PC and the CPU of the blade server B is Inter CPU, an issue arises if virtual machines on such different types of CPUs cannot be migrated in accordance with this exemplary handling strategy. Similarly, if the virtual machine hypervisor installed on the blade server A is a WMware hypervisor, while the virtual machine hypervisor installed on the blade server B is a Xen hypervisor, an issue arises if virtual machines with different types of hypervisors cannot be migrated in accordance with this exemplary handling strategy. Thus, the use of this exemplary handling strategy may not be able to achieve the expected technical effect in certain situations. The strategy checker 306 addresses such issues by determining the nature of potential issues with respect to the handling strategies. Checking rules that direct the functionality of the strategy checker 306 can be defined by a user.

Figure 4:
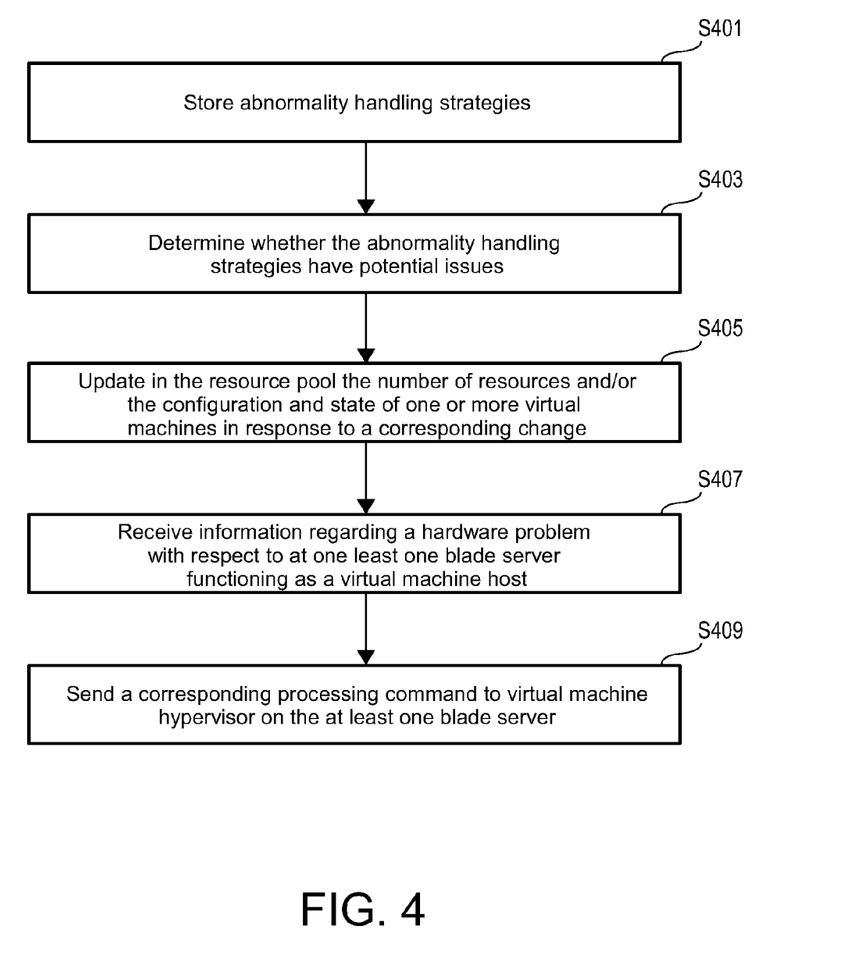
FIG. 4 schematically illustrates virtual machine processing operations with respect to a blade server system according to an exemplary embodiment.

FIG. 4 illustrates a virtual machine processing method with respect to the blade server system 200 in accordance with an exemplary embodiment. At step S407, information regarding a hardware problem with respect to the at least one blade server 202 is received directly from the blade server management module 201 by the virtual machine manager 204. At step S409, a processing command corresponding to the hardware problem is sent to the virtual machine hypervisor on the at least one blade server 202. According to an exemplary embodiment with respect to the step S409, the virtual machine manager 204 sends the processing command to the virtual machine hypervisor on the at least one blade server 202 having the hardware problem, in accordance with information about the hardware problem and handling strategies with respect to predefined hardware problems.

In accordance with the method, the virtual machine manager 204 may manage the resources of the at least one blade server 202 functioning as a virtual machine host, and a virtual machine may operate on the at least one blade server 202. The manner in which the virtual machine manager 204 manages the resources of the at least one blade server 202 functioning as the virtual machine host does not have a temporal sequential relationship with the abnormality reception and abnormality handling activities that occur with respect to hardware problems, since such resource management occurs throughout the entire life process of the virtual machine manager 204, and the abnormality reception and abnormality handling activities have temporal correlation with each other. The abnormality reception and abnormality handling activities can exist as a part of such resource management, or alternatively they can be executed independently by separate modules.

In accordance with an exemplary embodiment, at step S401 the virtual machine processing method further may comprise storing abnormality handling strategies, i.e., storing a mapping relationship between the predefined hardware problems and strategies for handling the predefined hardware problems. Since the mapping relationship between the predefined hardware problems and the strategies for handling the predefined hardware problems can be obtained via importation from external devices, step S401 may be executed at any time, and accordingly the order of execution as illustrated in FIG. 4 is merely exemplary.

In accordance with another exemplary embodiment, at step S403 it may be determined whether the abnormality handling strategies with respect to the predefined hardware problems have potential issues. Step S403 may be executed at any time, and accordingly the order of execution as illustrated in FIG. 4 is merely exemplary.

In accordance with another exemplary embodiment, at step S405 the number of resources and/or the configuration or state of the at least one virtual machine as indicated in the resource pool 303 may be updated in response to a corresponding change in the number of resources and/or a change in the configuration or the state of the at least one virtual machine. That is to say, if the number of resources of the blade server system 200 is changed, the number of the resources as indicated in the resource pool 303 is updated. Step S405 is an event triggering mechanism in the software and can be realized by interruption, periodic polling, etc. Since the number of resources may change at any time for various reasons, step S405 may be executed at any time, and accordingly the order of execution as illustrated in FIG. 4 is merely exemplary.

Figure 5:
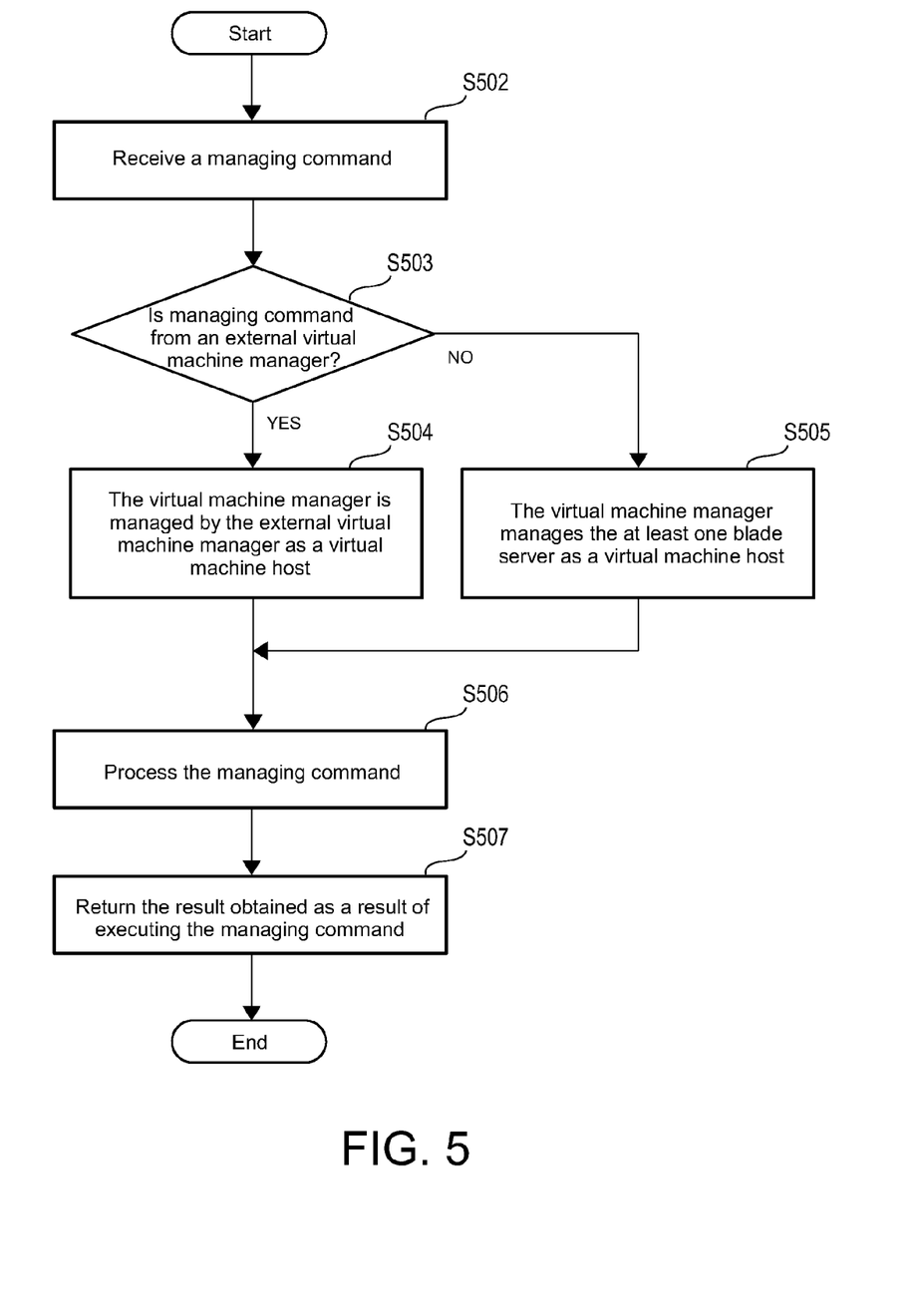
FIG. 5 schematically illustrates operations for processing a managing command received by a virtual machine manager according to an exemplary embodiment.

FIG. 5 schematically illustrates operations for processing a managing command received by the virtual machine manager 204 in accordance with an exemplary embodiment. Firstly, at step S502, the virtual machine manager 204 receives a managing command. Then, at step S503, the virtual machine manager 204 determines whether the managing command is from an external virtual machine manager. If it is determined that the received managing command is from an external virtual machine manager, then at step S504 the virtual machine manager 204 is managed by the external virtual machine manager as a virtual machine host. In such case, the external virtual machine manager has the capability to inquire about the number of all resources and the number of available resources of the blade server system 200, and the number of resources, the configuration, and the state of the at least one virtual machine managed by the virtual machine manager 204, as indicated in the resource pool 303.

If it is determined that the received managing command is from a client of the virtual machine manager, then at step S505 the virtual machine manager manages the at least one blade server as a virtual machine host. In such case, the client of the virtual machine manager has the capability to inquire about the number of all resources and the number of available resources of the at least one blade server 202 functioning as a virtual machine host as well as the number of resources and the number of available resources of the blade server system 200, and the number of resources, the configuration, and the state of the at least one virtual machine.

Subsequently, at step S506, the received managing command is processed. More specifically, in response to the association between the received managing command and the resources as indicated in the resource pool 303, the received managing command is processed in accordance with the received managing command and the available resources of the at least one blade server 202 functioning as a virtual machine host. It is appropriate to determine the available resources as indicated in the resource pool 303 because it is important to determine whether the resources of the at least one blade server 202 are sufficient in order to execute the managing command, which may entail, e.g., building a virtual machine. Moreover, it is important to determine whether the at least one virtual machine on the at least one blade server 202 has sufficient resources to carry out the managing command. Furthermore, it is important to determine whether there are sufficient resources to migrate an application on one virtual machine to another virtual machine should such migration become necessary. Then, at step S507, the execution result with respect to the managing command is returned. Finally, the process ends.

Although various exemplary embodiments are described here with reference to the drawings, it should be understood that the invention is not limited to these precise exemplary embodiments, and accordingly one skilled in the art may make various modifications to the exemplary embodiments without departing from the scope and the principle of the various embodiments. All of such variations and modifications are within the scope of the various embodiments as defined by the appended claims.

The various embodiments described herein may be embodied in the form of an apparatus, a method, or a computer program product. Thus, the various embodiments may be implemented in hardware, software (including firmware, residing software, microcode), or a combination of hardware and software. In addition, the various embodiments also may adopt the form of computer program product in any medium of expression, with computer-usable program code included therein.

Any combination of one or more computer-usable or computer-readable mediums may be used. Such computer-usable or computer-readable medium may be, but is not limited to, an electric, magnetic, optic, electro-magnetic, infrared, or semiconductor system, apparatus, device, or transmission medium. More particular examples of a computer-usable or computer-readable medium include an electric connection with one or more wires, portable computer disk, hard disk, Random Access Memory (RAM), Read Only Memory (ROM), Erasable Programmable Read Only Memory (EPROM or flash memory), optical fiber, portable Compact Disc Read Only Memory (CD-ROM), optical storage device, such as transmission medium supporting Internet or Intranet, or magnetic storage device. In the context of this document, the computer-usable or computer-readable medium may be any medium for containing, storing, transferring, transporting, or transmitting programs to be used by an instruction execution system, apparatus, or device or to be associated with the instruction execution system, apparatus, or device. The computer-usable medium may include a data signal embodying the computer-usable program codes, transmitted in the base band or as a part of the carrier. The computer-usable program codes may be transmitted by any suitable medium, including but not limited to wireless, wired, cable, RF, etc.

The computer program code for performing operations in accordance with the various embodiments described herein may be composed in any combination of one or more programming languages, including object-oriented programming languages such as Java, Smalltalk, C++, etc., and normal process programming languages such as "C" programming language or the like. The program code may be executed entirely on a user's computer, as one independent software package, partially on a user's computer and partially on a remote computer or server, or entirely on a remote computer or server. In the latter case, such remote computer or server may be connected to a user's computer by any type of network, including Local Area Network (LAN) or Wide Area Network (WAN), or to an external computer (e.g., via an Internet service provider).

In addition, each block of the flowcharts and/or block diagrams and the combinations of blocks in the flowcharts and/or block diagrams as described herein with respect to the various embodiments may be realized via computer program instructions. Such computer program instructions may be provided to processors of general computers, dedicated computers, or other programmable data processing apparatus to produce a machine for realizing the functions/operations prescribed in blocks in the flowcharts and/or block diagrams.

Such computer program instructions also may be stored in a computer-readable medium capable of instructing a computer or other programmable data processing apparatus to operate in a particular manner. Thus, the instructions stored in the computer-readable medium enable realization of the functions/operations prescribed in blocks in the flowcharts and/or block diagrams.

Furthermore, such computer program instructions also may be loaded into a computer or other programmable data processing apparatus in order to enable the computer or other programmable data processing apparatus to execute a series of operation steps for generating the process realized by the computer, thereby providing a process for realizing the functions/operations prescribed in blocks in the flowcharts and/or block diagrams as described herein with respect to the various embodiments.

The flowcharts and the block diagrams in the drawings illustrate the possible architectures, functions, and operations according to a system, method, and computer program product in accordance with the various embodiments described herein. In this regard, each block in the flowcharts and/or block diagrams can represent a module, a program segment, or a code portion, and said module, program segment, or code portion includes one or more executable instructions for realizing the defined logical functions. It is also noted that, in alternative embodiments, the functions denoted in the blocks may occur in a sequence distinct from that provided in the drawings. For example, two sequentially-shown blocks may be executed in parallel or may be executed in a reverse order, depending on the related functions. Moreover, it is noted that each block in the flowcharts and/or block diagrams and the combinations of blocks in the flowcharts and/or block diagrams may be realized via a dedicated hardware-based system for executing prescribed functions or operations or via a combination of the dedicated hardware and computer instructions.

What is claimed is:

1. A system comprising:
   a virtual machine manager;
   a blade server management module;
   at least one blade server; and
   a virtual machine manager comprising an abnormal event receiving module for receiving information about a hardware problem of a blade server directly from said blade server management module and a virtual machine management module for sending a processing command to a virtual machine hypervisor on said blade server having said hardware problem, wherein said processing command is determined in accordance with said information about said hardware problem and strategies for handling predefined hardware problems, and wherein said virtual machine management module comprises a strategy checker for determining any issue with respect to said strategies for handling said predefined hardware problems.

2. The system of claim 1, wherein said virtual machine management module receives said information about said hardware problem from said abnormal event receiving module.

3. The system of claim 1, wherein said virtual machine manager manages resources of said at least one blade server as a virtual machine host, and wherein said virtual machine manager manages at least one virtual machine operating on said at least one blade server.

4. The system of claim 1, wherein said virtual machine manager is integrated into said blade server management module.

5. The system of claim 1, wherein said virtual machine management module further comprises a storage module for storing a mapping relationship between said predefined hardware problems and said strategies for handling said predefined hardware problems.

6. The system of claim 3, wherein said virtual machine management module further comprises:
   an external service interface module for receiving a managing command and for returning an execution result with respect to said managing command;
   a command processing module for processing said managing command;
   a resource pool for storing properties with respect to resources of said system; and
   a resource pool management module for updating one or more of said properties stored in said resource pool in response to one or more corresponding changes to said resources of said system.

7. The system of claim 6, wherein said properties with respect to said resources of said system comprise a number of resources and a number of available resources of said system, a number of resources and a number of available resources of said at least one blade server, and a number of resources, a configuration, and a state of said at least one virtual machine.

8. The system of claim 7, wherein in response to said managing command received by said external service interface module being from an external virtual machine manager, said external virtual machine manager manages said virtual machine manager as a virtual machine host, wherein said external virtual machine manager has a capability to inquire about said number of all resources and said number of available resources of said system, and said number of resources, said configuration, and said state of said at least one virtual machine, but does not have a capability to inquire about said number of resources and said number of available resources of said at least one blade server.

9. The system of claim 7, wherein in response to said managing command received by said external service interface module being from a client of said virtual machine manager, said virtual machine manager manages said at least one blade server as a virtual machine host, wherein said client has a capability to inquire about said number of resources and said number of available resources of said at least one blade server as well as said number of all resources and said number of available resources of said system, and said number of resources, said configuration, and said state of said at least one virtual machine.

10. The system of claim 8, wherein in response to an association between said managing command and said resources of said system as indicated in said resource pool, said command processing module processes said managing command in accordance with said managing command and said resources of said at least one blade server.

11. The system of claim 9, wherein in response to an association between said managing command and said resources of said system as indicated in said resource pool, said command processing module processes said managing command in accordance with said managing command and said resources of said at least one blade server.

12. A method for processing with respect to a system including a virtual machine manager, a blade server management module, and at least one blade server, said method comprising:
   receiving information about a hardware problem of a blade server directly from said blade server management module;
   determining a processing command in accordance with said information about said hardware problem and strategies for handling predefined hardware problems;
   determining any issue with respect to said strategies for handling said predefined hardware problems; and
   sending said processing command to a virtual machine hypervisor on said blade server having said hardware problem.

13. The method of claim 12, said method further comprising:
   managing resources of said at least one blade server as a virtual machine host; and
   operating at least one virtual machine on said at least one blade server.

14. The method of claim 12, said method further comprising storing a mapping relationship between said predefined hardware problems and said strategies for handling said predefined hardware problems.

15. The method of claim 13, said method further comprising:
   receiving a managing command;
   processing said managing command; and
   returning an execution result of said managing command.

16. The method of claim 15, said method further comprising:
- storing properties with respect to resources of said system; and
- updating one or more of said properties in response to one or more corresponding changes to said resources of said system.

17. The method of claim 16, wherein said properties with respect to said resources of said system comprise a number of resources and a number of available resources of said system, a number of resources and a number of available resources of said at least one blade server, and a number of resources, a configuration, and a state of said at least one virtual machine.

18. The method of claim 17, wherein in response to said managing command being from an external virtual machine manager, said method further comprises managing said virtual machine manager as a virtual machine host via said external virtual machine manager, wherein said external virtual machine manager has a capability to inquire about said number of all resources and said number of available resources of said system, and said number of resources, said configuration, and said state of said at least one virtual machine, but does not have a capability to inquire about said number of resources and said number of available resources of said at least one blade server.

19. The method of claim 17, wherein in response to said managing command being from a client of said virtual machine manager, said method further comprises managing said at least one blade server as a virtual machine host via said virtual machine manager, wherein said client has a capability to inquire about said number of resources and said number of available resources of said at least one blade server as well as said number of all resources and said number of available resources of said system, and said number of resources, said configuration, and said state of said at least one virtual machine.

20. A virtual machine management apparatus comprising:
- an abnormal event receiving module for receiving information about a hardware problem of a blade server directly from a blade server management module; and
- a virtual machine management module for sending a processing command to a virtual machine hypervisor on said blade server having said hardware problem, wherein said processing command is determined in accordance with said information about said hardware problem and strategies for handling predefined hardware problems, and wherein said virtual machine management module comprises a strategy checking module for determining any issue with respect to said strategies for handling said predefined hardware problems.

21. The virtual machine management apparatus of claim 20, wherein said virtual machine management module receives said information about said hardware problem from said abnormal event receiving module.

22. The virtual machine management apparatus of claim 20, wherein said virtual machine management module further comprises a storage module for storing a mapping relationship between said predefined hardware problems and said strategies for handling said predefined hardware problems.

* * * * *